(12) United States Patent
Shah et al.

(10) Patent No.: US 10,366,225 B2
(45) Date of Patent: Jul. 30, 2019

(54) METHOD FOR ALLOWING A CONFIGURATION CHANGE OF AN INTELLIGENT ELECTRONIC DEVICE OF A POWER SYSTEM

(71) Applicant: ABB SCHWEIZ AG, Baden (CH)

(72) Inventors: Vishal Shah, Gotri (IN); Darshit Prajapati, Manjalpur (IN); Dinesh Vaghela, Gomtipur (IN); Nayan Shah, Majalpur Naka (IN)

(73) Assignee: ABB Schweiz AG, Baden (CH)

( * ) Notice: Subject to any disclaimer, the term of this patent is extended or adjusted under 35 U.S.C. 154(b) by 165 days.

(21) Appl. No.: 15/307,363

(22) PCT Filed: Mar. 24, 2015

(86) PCT No.: PCT/IB2015/052128
§ 371 (c)(1),
(2) Date: Oct. 27, 2016

(87) PCT Pub. No.: WO2015/177656
PCT Pub. Date: Nov. 26, 2015

(65) Prior Publication Data
US 2017/0053112 A1    Feb. 23, 2017

(30) Foreign Application Priority Data
May 19, 2014   (IN) .......................... 2481/CHE/2014

(51) Int. Cl.
*G06F 21/46* (2013.01)
*H02H 1/00* (2006.01)
(Continued)

(52) U.S. Cl.
CPC ................ *G06F 21/46* (2013.01); *G06F 1/28* (2013.01); *H02H 1/0092* (2013.01);
(Continued)

(58) Field of Classification Search
CPC .......... G06F 21/31; G06F 21/00; G06F 21/30; G06F 21/46; G06F 1/28; G01R 19/2513; H02H 1/0092; H02H 3/006
(Continued)

(56) References Cited

U.S. PATENT DOCUMENTS 7,734,359 B2 *   6/2010   Deveaux ................... G06F 8/60
                                                     700/286
9,882,893 B2 *   1/2018   Sundaresh .............. G06F 21/45
(Continued)

FOREIGN PATENT DOCUMENTS

EP          2290900 A1      3/2011
WO       2013097887 A1      7/2013

OTHER PUBLICATIONS

International Search Report issued in connection with International Application No. PCT/IB2015/052128, dated May 20, 2015, 3 pages.
(Continued)

*Primary Examiner* — Ji H Bae
(74) *Attorney, Agent, or Firm* — Barnes & Thornburg LLP

(57) ABSTRACT

The invention relates to a method for allowing a configuration change of an Intelligent Electronic Device (IED) of a power system, wherein the configuration change affects an operation of the IED. The method comprises receiving a request at the IED for the configuration change, wherein the request comprises a configuration change signal. The configuration change signal is received at the IED in response to establishing a connection between an I/O module of the IED and a signalling component. The method further comprises verifying the request automatically by the IED, wherein verifying the request comprises detecting a predetermined signal pattern at the I/O module upon receiving the configuration change signal, wherein the predetermined signal pattern is stored in a memory associated with the IED.
(Continued)

In addition, the method comprises enabling the configuration change in response to successful verification of the request by the IED.

8 Claims, 3 Drawing Sheets

(51) Int. Cl.
  *H02H 3/00* (2006.01)
  *G06F 1/28* (2006.01)
  *G06F 21/00* (2013.01)
  *G06F 21/31* (2013.01)
  *G06F 21/30* (2013.01)
  *G01R 19/25* (2006.01)

(52) U.S. Cl.
  CPC ......... *H02H 3/006* (2013.01); *G01R 19/2513* (2013.01); *G06F 21/00* (2013.01); *G06F 21/30* (2013.01); *G06F 21/31* (2013.01)

(58) Field of Classification Search
  USPC ............................................ 713/100; 726/28
  See application file for complete search history.

(56) References Cited

U.S. PATENT DOCUMENTS

| | | | |
|---|---|---|---|
| 9,998,326 B2* | 6/2018 | Thanos | H04L 41/0809 |
| 2003/0217293 A1* | 11/2003 | Lee | G06F 21/31 |
| | | | 726/16 |
| 2008/0162930 A1* | 7/2008 | Finney | H04L 63/083 |
| | | | 713/165 |
| 2008/0201582 A1 | 8/2008 | Jachmann et al. | |
| 2012/0198226 A1* | 8/2012 | Wimmer | G06F 21/57 |
| | | | 713/100 |

OTHER PUBLICATIONS

Written Opinion issued in connection with International Application No. PCT/IB2015/052128, dated May 20, 2015, 3 pages.

International Preliminary Report on Patentability, International Application No. PCT/IB2015/052128, dated Nov. 22, 2016, 8 pages.

* cited by examiner

METHOD FOR ALLOWING A CONFIGURATION CHANGE OF AN INTELLIGENT ELECTRONIC DEVICE OF A POWER SYSTEM

CROSS-REFERENCE TO RELATED APPLICATIONS

This application is a U.S. national stage of International Application Serial No. PCT/IB2015/052128, filed Mar. 24, 2015, which claims priority to Indian Patent Application No. 2481/CHE/2014, filed May 19, 2014. The entire disclosures of both of the foregoing applications are hereby incorporated by reference.

FIELD OF THE INVENTION

The invention relates to an Intelligent Electronic Device (commonly referred to as IED or controller) of a power system. More specifically, the invention relates to managing configuration of the IED for various functions including, but not limited to, power system protection, control and automation.

BACKGROUND OF THE INVENTION

A conventional IED as applied in power system protection, control and automation is provided with different levels of role based authentication. An administrator can program individual configurations such as passwords for each level. A brief application of an IED is shown in FIG. 1. It is required that certain configuration information such as password should be recovered on an IED if a customer forgets the same. Different techniques are used for recovering password. For instance, an IED is sent back to manufacturer to reset the password. Alternately, one needs to contact support line with details such as serial number and password recovery code (randomly generated code by IED). In such cases, the customer support on receipt of these details will generate and send a recovery password, which can be used to reset the password of the device.

The available techniques requires that an IED is either sent back to the manufacturer or one needs to contact customer support, which might not be immediately feasible in certain circumstances for e.g. IED being installed in some remote desert area or in marine applications. Thus, the technical challenge is to have an easy, quick and simple methodology which also ensures that configuration management functions are easily carried out. For example, the password can be reset by the customer himself when the IED is not connected to the system and under its own supervision, without any need of manufacturer's support-line, or additional hardware or security code generating software or connecting the device to network so as to communicate with any server and the most important that the resetting happens without jeopardizing the basic security need.

SUMMARY OF THE INVENTION

An aspect of the invention provides a method for allowing a configuration change of an Intelligent Electronic Device (IED). The configuration change can be, but need not be limited to, password change or reset, configuration rule change and IED operation policy change. In an embodiment of the invention, the configuration change is password reset. The configuration change affects an operation of the IED. For example, if the configuration change leads to a change in an access password, the IED cannot be accessed later without the new password. Taking another example, if the configuration change affects a measuring parameter associated with an access password, then after the change, the measurement is performed as per the new measurement parameters. It may be possible to use an IED for various functions such as control, measurement, supervision, protection and so forth. Further, such an IED may be shared by various personnel who may have different roles. Accordingly, a configuration change may affect one or more of, but not limited to, one or more functions, one or more roles and one or more access rights/privileges.

The method for allowing the configuration change comprises receiving a request at the IED for the configuration change. The request can be provided by a user such as an administrator or a customer associated with the IED. The request comprises a configuration change signal. The configuration change signal can be, but need not be limited to, a digital/analog signal, a measurement signal, a thermal signal, a reference signal, a voltage signal, a current signal and a communication signal. There may be numerous variations in the configuration change signal. For example, a combination of digital, analog, and command can be provided as a configuration change signal. Taking another example, different types of signals (e.g. thermal, measurement, digital, analog, communication etc.) can be used (either alone or in combination). The configuration change signal is received at the IED in response to establishing a connection between an I/O module of the IED and a signalling component. The I/O module of the IED can be one of, but not limited to, a digital I/O module, an analog I/O module, a communication I/O module, a network I/O module and a combination thereof.

In an embodiment, the signalling component is a power supply. The invention is not limited to the use of a power supply as the signaling component. For instance, the signaling component may be a communication terminal. Further, the signalling component may include a combination of different components so as to provide a combination of signals for the configuration change. The signaling component may be connected directly to the IED or via a wired/wireless network. In accordance with the embodiment, establishing the connection between the I/O module and the power supply comprises creating a feedback loop using at least one input and at least one output of the I/O module and the power supply. The at least one input can be an input port or terminal and the at least one output can be an output port or terminal. Further, different combinations of inputs and outputs can be used. For instance, one input and one output may be used. Alternately, two inputs and one output may be used. Further, any number of channels (e.g. one or more digital I/O channels, one or more analog I/O channels, one or more communication channels, one or more network channels or a combination thereof) can be used and the connection with the signalling component can be established in numerous ways to create a feedback loop.

In accordance with the embodiment, creating the feedback loop comprises switching off the IED and disconnecting the IED from the power system. Disconnecting from the power system may include removing the IED from a power system panel. Creating the feedback loop further comprises connecting the at least one input, the at least one output and the power supply such that the at least one output is arranged to provide a feedback to the at least one input. In addition, creating the feedback loop comprises switching on the IED.

In an embodiment, in addition to the configuration change signal, the request comprises a user input, wherein the user input is received at a communication interface of the IED. Examples of the user input can include, but need not be limited to, a button press, a keypad input, a keyboard input, a touch screen input, a biometric input, a joystick input, an audio/video input or a combination thereof. Similarly, examples of the communication interface can include, but need not be limited to, a button (e.g. a Human Machine Interface (HMI) button), a keypad, a keyboard, a touch screen, a biometric sensor, a joystick, an audio/video interface or a combination thereof.

The method for allowing the configuration change further comprises verifying the request automatically by the IED. In accordance with the aspect, verifying the request comprises detecting a predetermined signal pattern at the I/O module upon receiving the configuration change signal, wherein the predetermined signal pattern is stored in a memory associated with the IED. For example, the predetermined signal pattern can be stored in a memory of the IED or in a memory connected with the IED.

In accordance with the embodiment where a feedback loop is created by connecting the IED with the power supply, verifying the request further comprises verifying the feedback from the at least one output to the at least one input. Here, verifying the feedback may comprise detecting the predetermined signal pattern at the at least one input. Alternately, if a particular communication signal is set for configuration change, then the predetermined signal pattern detection would comprise detecting the communication signal for verification. If a combination of signals or a series of signals or both is set for configuration change, then detecting the predetermined signal pattern would comprise detecting the combination of signals or the series of signals or both (as the case may be) for verification.

In accordance with an embodiment, verifying the request also comprises detecting status of at least one analog channel (e.g. 1, 2, 3 etc.). For example, to provide additional security, it may be set that all analog channels should be disabled/inactive. Accordingly, verifying the request would comprise checking if all the analog channels are inactive. Alternately, it may be set that only certain analog channels are active. In such a situation, the verification would comprise verifying that only those analog channels are active while the rest are not.

In accordance with the embodiment wherein the request also comprises the user input, verifying the request also comprises matching the user input with a predetermined user input stored in the memory. For example, information regarding which HMI button is to be pressed along with the configuration change signal can be stored on a memory of or associated with the IED and the user input can be compared with this information for verification.

In addition, the method for allowing the configuration change comprises enabling the configuration change in response to successful verification of the request by the IED. In an embodiment, the configuration change is enabled for a predetermined period of time in response to the successful verification. For example, a password reset function can be enabled for 30 seconds after successful verification.

BRIEF DESCRIPTION OF THE DRAWINGS

The subject matter of the invention will be explained in more detail in the following text with reference to exemplary embodiments which are illustrated in the attached drawings, in which.

DETAILED DESCRIPTION

Figure 1:
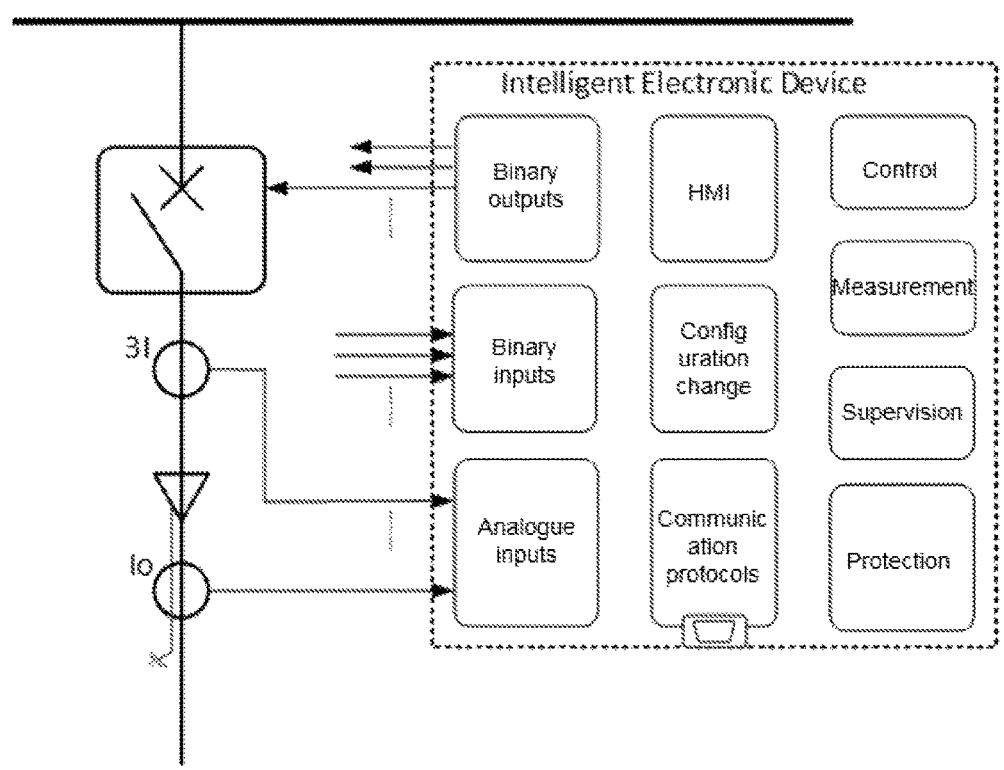
FIG. 1 illustrates a simplified diagram of an Intelligent Electronic Device (IED) of a power system.
Figure 2:
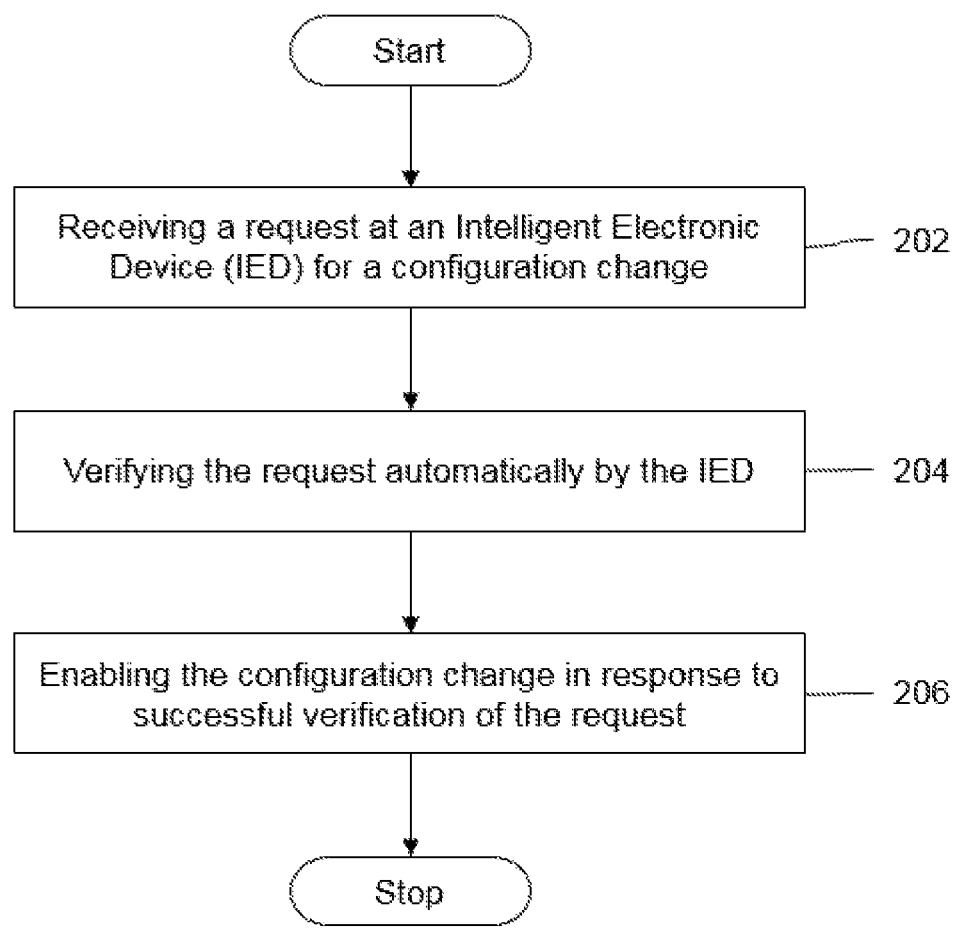
FIG. 2 is a flowchart of a method for allowing a configuration change of the IED.

Referring now to FIG. 2, which illustrates a flowchart of a method for allowing a configuration change of an Intelligent Electronic Device (IED) in accordance with an aspect of the invention. The configuration change can be, but need not be limited to, password change or reset, operational policy change, measurement parameter change and configuration rule change. For example, the configuration change can be resetting an access password of the IED.

The method comprises receiving a request at the IED for the configuration change at 202. The request can be made by an authorised user of the IED. An example of an authorised user can be, but need not be limited to, a customer and an administrator. The request comprises a configuration change signal. The configuration change signal can be, but need not be limited to, a digital/analog signal, a measurement signal, a thermal signal, a reference signal, a voltage signal and a current signal. For example, a combination of digital, analog, and command can be provided as a configuration change signal. Taking another example, different types of signals (e.g. thermal, measurement, digital, analog, communication etc.) can be used (either alone or in combination).

The configuration change signal is received at the IED in response to establishing a connection between an I/O module of the IED and a signalling component. The I/O module of the IED can be one of, but not limited to, a digital I/O module, an analog I/O module, a communication I/O module, a network I/O module and a combination thereof.

In an embodiment, the signalling component is a power supply. The invention is not limited to the use of a power supply as the signaling component. For instance, the signaling component may be a communication terminal. Further, the signalling component may include a combination of different component so as to provide a combination of signals for the configuration change. The signaling component may be connected directly to the IED or via a wired/wireless network.

In accordance with the embodiment, establishing the connection between the I/O module of the IED and the power supply comprises switching off the IED and taking the IED out of the power system panel it is attached to. For example, an authorised user such as an administrator or customer can switch off the IED and remove it from the panel. The IED can be taken out of the automation system upon disabling any alarm (e.g. if enabled) associated with taking out the IED. The authorized user of the automation system disables the functionality of the IED via the automation system interface and the alarms. Subsequently, the authorized user disconnects and takes out the IED from the system.

Figure 3:
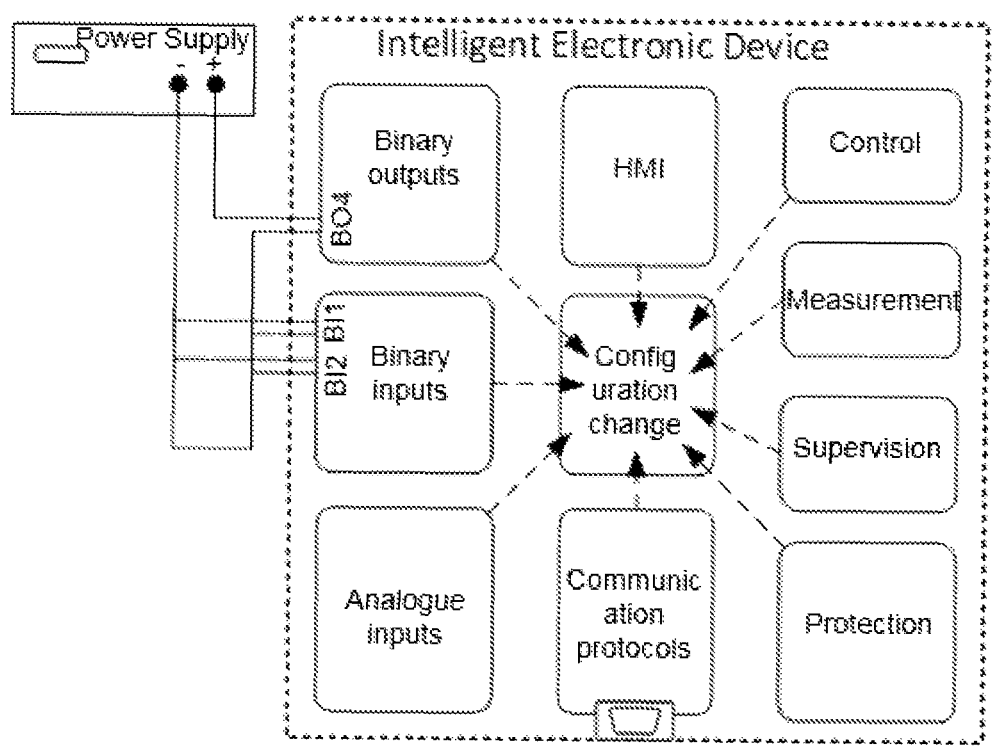
FIG. 3 illustrates a simplified diagram of a connection between the IED and a signalling component.

In accordance with the embodiment, establishing the connection further comprises creating a feedback loop using at least one input and at least one output of the I/O module and the power supply. The input and output of the I/O module can include one or more ports or terminals. For example, one binary output (BO) port and two binary input (BI) ports can be used for creating a feedback loop. Alternately, two BO ports and two BI ports can be used for creating the feedback loop. An example of a feedback loop is illustrated in FIG. 3. In the embodiment illustrated in FIG. 3, a BO port (BO4) is connected with two BI ports (BI1 and BI2).

Further, all the I/O ports are connected with one or more corresponding ports or terminals of the power supply to complete the feedback loop. It is possible to have various connections between I/O ports and the signalling component. For instance, two BO ports and three BI ports may be used with a power supply. Alternately, two BO ports and one BI port may be used. Once the feedback loop is created, the IED is switched on. After switching on, the configuration change signal is received at the I/O module of the IED (i.e. at the corresponding BI and BO ports). For example, in the connection illustrated in FIG. 3, a predetermined switching pattern of certain duration is generated and received as a configuration change signal at the I/O module.

In an embodiment, in addition to the configuration change signal, the request comprises a user input, wherein the user input is received at a communication interface of the IED. Examples of the user input can include, but need not be limited to, a button press, a keypad input, a keyboard input, a touch screen input, a biometric input, a joystick input, an audio/video input or a combination thereof. Similarly, examples of the communication interface can include, but need not be limited to, a button (e.g. HMI button), a keypad, a keyboard, a touch screen, a biometric sensor, a joystick, an audio/video interface or a combination thereof.

Once the request is provided, at 204, the request is verified. The verification is performed automatically by the IED. In the embodiment illustrated in FIG. 3, once the above indicated connections are established and the IED is powered on, at the instance of power on, the binary information available at binary inputs are logical FALSE. Thereafter, once the IED completes its self-supervision, its unit-ready contact operates (i.e. the BO port reads logical TRUE) and the status change is seen by all the BI ports simultaneously. The IED compares this status information at the BI ports just before and after activation of unit-ready contact (BO port). If the status of the BI ports seen by the IED has changed (e.g. the predetermined signal pattern is received) and at the same time no signal is available at the analog channels (e.g. optionally for further cross verification that the IED is not connected to the power system), the verification of the configuration change signal is successful.

In case the request also comprises the user input, the IED also matches the user input with a predetermined user input for the verification. For example, a predetermined HMI input has to be provided by the user to complete the verification in addition to establishing the aforementioned connection.

In response to successful verification of the request, at 206, the configuration change is enabled. For example, an admin access can be granted for resetting an access password. Further, the access can be enabled for a preset duration. During this preset duration, the user (e.g. customer) is allowed to reset the password. In order to reset the password user has to navigate to the change password menu or may need to press some key combination (e.g. up-down key together) on HMI for specified duration of time or a command is issued via communication. On receipt of such an input, a pop up message may be displayed on the IED indicating "Is password reset required?" On confirmation, the password reset can be enabled.

In the embodiment illustrated in FIG. 3, BO4 configured as a fixed unit ready contact is taken as an example. In this connection, for a configuration change such as resetting the password, it is required that the IED is taken out from the installation and the BO4 is connected to BI1 as well as BI2 (i.e. back to back connection). Now the IED is powered on. If the IED is healthy, the unit ready contact i.e. BO4 gets activated. As BO4 is connected to BI1 as well as BI2, on activation of BO4 these two BI will get logical TRUE. IED will detect that before the activation of BO4, these two BIs 1 and 2 were logical FALSE and both got simultaneously logical TRUE after activation of unit ready contact. When this condition is fulfilled, the IED will automatically be logged in as administrator for a preset duration (e.g. 5 minutes) and the user can changed the password.

The invention is not limited to binary inputs and outputs as illustrated in FIG. 3. It can be extended to any other inputs and outputs for e.g. analog or communication etc. Further, the invention is not limited to the signals or connections or detections as described above and various modifications are possible and as such would be readily apparent to those of ordinary skull in the art. For example, other possible methods could use some external hardware connections and giving specific coded command via communication interface for changing the configuration or hard coded information via hardware connection like known number of pulses of specific duration from BO to BI can be provided for changing configuration. Additionally, it is to be noted that while certain examples given above relate to resetting of passwords, various configuration changes are possible using the method disclosed herein. Examples of such changes include, but are not limited to, reset of additional aspects in relation to administration and configuration of IED such as configuration rules, IED operational policies etc. This method may be restricted to reset a specific configuration instance of IED and for resetting other configuration instances the IED may have to be sent back to the factory. The configuration changes in accordance with the method can also be achieved by using wired/wireless networks in case the IED is network enabled. For example, the configuration change signal or the user input or both may be provided via the network using an external device.

We claim:

1. A method for allowing a change in configuration of an Intelligent Electronic Device (IED) of a power system with a signalling component, the method comprising:
   receiving a request at the IED for changing the configuration, wherein the request comprises a signal from the signalling component along with a user input, wherein the signal is received from the signalling component at the IED in response to establishing a connection between an I/O module of the IED and the signalling component, wherein the user input is received at a communication interface of the IED, and wherein establishing the connection between the I/O module and the signalling component comprises creating a feedback loop using at least one input of the I/O module of the IED, at least one output of the I/O module of the IED, and the signalling component;
   verifying the request automatically by the IED, wherein verifying the request comprises detecting a predetermined signal pattern at the I/O module upon receiving the signal, wherein the predetermined signal pattern is stored in a memory associated with the IED; and
   enabling the change in configuration in response to verification of the request by the IED.

2. The method as claimed in claim 1, wherein verifying the request comprises matching the user input with a predetermined user input stored in the memory.

3. The method as claimed in claim 1, wherein the signalling component is a power supply.

4. The method as claimed in claim 3, wherein creating the feedback loop comprises:
- switching off the IED;
- disconnecting the IED from the power system;
- connecting the at least one input, the at least one output and the power supply such that the at least one output is arranged to provide a feedback to the at least one input; and
- switching on the TED.

5. The method as claimed in claim 4, wherein verifying the request further comprises verifying the feedback from the at least one output to the at least one input.

6. The method as claimed in claim 4, wherein verifying the request further comprises detecting status of at least one analog channel.

7. The method as claimed in claim 1, wherein the change is a password reset.

8. The method as claimed in claim 1, wherein the change is enabled for a predetermined period of time in response to the verification.

* * * * *